(12) United States Patent
Hepner et al.

(10) Patent No.: US 7,464,963 B2
(45) Date of Patent: Dec. 16, 2008

(54) MILITARY MOTOR VEHICLE FOR TRANSPORTING PERSONNEL

(75) Inventors: Eugen Hepner, Krailling (DE); Susanne Relsner, Kreuzholzhausen (DE); Eugen Schlegl, Gröbenzell (DE); Christoph Wittmann, München (DE)

(73) Assignee: Krauss-Maffei Wegmann GmbH & Co. KG (DE)

( * ) Notice: Subject to any disclaimer, the term of this patent is extended or adjusted under 35 U.S.C. 154(b) by 428 days.

(21) Appl. No.: 10/558,318

(22) PCT Filed: Apr. 27, 2004

(86) PCT No.: PCT/DE2004/000873

§ 371 (c)(1),
(2), (4) Date: Nov. 22, 2005

(87) PCT Pub. No.: WO2004/108485

PCT Pub. Date: Dec. 16, 2004

(65) Prior Publication Data

US 2006/0273566 A1   Dec. 7, 2006

(30) Foreign Application Priority Data

May 22, 2003   (DE) .................. 103 23 076

(51) Int. Cl.
*B60R 21/13* (2006.01)
*B60N 2/00* (2006.01)
*B60J 7/00* (2006.01)

(52) U.S. Cl. .................. 280/756; 296/64; 296/102

(58) Field of Classification Search .............. 180/89.1, 180/89.11, 89.12; 280/638, 35, 639, 756; 296/64, 102
See application file for complete search history.

(56) References Cited

U.S. PATENT DOCUMENTS

| | | | | | |
|---|---|---|---|---|---|
| 1,556,529 | A | * | 10/1925 | Logemann | 296/102 |
| 1,569,807 | A | * | 1/1926 | Hull | 296/102 |
| 2,278,450 | A | * | 4/1942 | Jones | 296/24.33 |
| 2,324,508 | A | * | 7/1943 | Johnson | 296/36 |
| 2,535,242 | A | * | 12/1950 | Stuart | 296/63 |
| 2,665,165 | A | * | 1/1954 | Pitman | 296/193.12 |
| 2,690,351 | A | * | 9/1954 | Giles | 296/102 |
| 2,692,795 | A | * | 10/1954 | Lander | 296/102 |
| 2,799,321 | A | * | 7/1957 | Liljengren et al. | 296/64 |
| 3,009,212 | A | * | 11/1961 | Makens | 52/66 |
| 3,244,251 | A | * | 4/1966 | Duncan | 280/756 |
| 3,259,211 | A | * | 7/1966 | Ryskamp | 280/756 |
| 3,336,074 | A | * | 8/1967 | Barnes et al. | 296/102 |

(Continued)

FOREIGN PATENT DOCUMENTS

DE   35 16 671   11/1986

*Primary Examiner*—Laura Freedman
(74) *Attorney, Agent, or Firm*—Robert W. Becker; Robert W. Becker & Assoc (57) ABSTRACT

A military motor vehicle for transporting personnel, comprising a chassis on which are successively disposed a driver's cabin and an upwardly open transport structure that can be covered by a tarpaulin and has seats and/or benches. A roll protection device is disposed on the upper side of the transport structure and comprises two roll bars, each of which is disposed over a side wall of the transport structure and extends in the longitudinal direction and over the entire length thereof. Each end of each roll bar is releasably attached to the transport structure. The roll bars are interconnected by reinforcing elements that extend transverse to the longitudinal direction.

13 Claims, 7 Drawing Sheets

U.S. PATENT DOCUMENTS

| | | | |
|---|---|---|---|
| 3,384,412 A * | 5/1968 | Wingen | 296/96.2 |
| 3,390,913 A * | 7/1968 | Hunter | 296/10 |
| 3,455,599 A * | 7/1969 | Becker | 296/102 |
| 3,472,550 A * | 10/1969 | Marco | 296/102 |
| 3,536,353 A * | 10/1970 | Goodacre | 296/102 |
| 4,188,060 A | 2/1980 | Alcanzare | |
| 4,303,271 A * | 12/1981 | Law | 296/10 |
| 4,319,777 A * | 3/1982 | Law | 296/64 |
| 4,374,601 A * | 2/1983 | Taylor et al. | 296/63 |
| 4,632,448 A * | 12/1986 | Yagasaki et al. | 296/218 |
| 5,098,148 A * | 3/1992 | Hoban | 296/66 |
| 5,167,481 A * | 12/1992 | Gotz | 414/635 |
| 6,196,604 B1 * | 3/2001 | Hoh et al. | 296/26.05 |
| 6,471,280 B1 | 10/2002 | Fowler | |

* cited by examiner

MILITARY MOTOR VEHICLE FOR TRANSPORTING PERSONNEL

This specification for the instant application should be granted the priority date of May 22, 2003, the filing date of the corresponding German Patent application 103 23 076.9 as well as the priority date of Apr. 27, 2004, the filing date of the corresponding International patent application PCT/DE2004/000873 filed Apr. 27, 2004.

BACKGROUND OF THE INVENTION

The invention concerns a military motor vehicle for transporting personnel. The vehicle is comprised of a chassis on which a transport structure is mounted behind a driver's cabin. The transport structure serves to accommodate personnel and therefore contains several seats and/or benches. The top of the transport structure is open and can be covered with a tarpaulin. The top is also equipped with a roll protection device.

Military motor vehicles that can be transported in medium size aircrafts and especially in helicopters are becoming more and more important for international military operations. In order to enable transporting in such an aircraft, they have to meet certain requirements regarding weight empty and external-dimension measurements. This invention is based on the object of developing a military motor vehicle that would meet the above-mentioned requirements and that could be manually adjusted for loading into and aircraft. It is of particular importance that the vehicle's height not exceed the permissible loading dimension.

SUMMARY OF THE INVENTION

To solve this problem, the roll protection device is formed of two longitudinally extending roll bars, each placed above one of the side walls of the transport structure. Both ends of each roll bar are locked to the transport structure and can be released. Reinforcing elements running transverse to them connect the roll bars.

The total height of the military motor vehicle is mainly defined by the roll protection device on top of the transport structure. The basic idea of this invention is to develop a roll protection device that can be quickly moved from a higher work position to a lower transport position after releasing the locking devices. For this reason, the roll protection device comprises two roll bars extending in the longitudinal direction over the whole length of the transport structure. Reinforcing elements running transverse to the direction of the roll bars connect them. A releasable lock connects both ends of each roll bar with the transport structure. After releasing the lock it is therefore possible to quickly detach the entire roll protection device and place it in a lower position. A particular embodiment of the roll protection device has the advantage that the roll bars can simply be shifted from a higher work position to a lower transport position after the locking devices have been released.

For the purpose of saving weight, the backrests including neck supports of seats or benches can be integrated into the reinforcing elements that extend transverse to the roll bars. It has further turned out to be an advantage that the height of the drivers cabin can be reduced for loading and transporting purposes. This is possible because the driver's cabin has a hood that is connected to the back wall of the cabin by hinges. The hood can be shifted rearwards (at least 180°) so that it comes to rest between the side walls of the transport structure.

It is possible to load the military motor vehicle equipped according to the described invention into a helicopter, e.g. of the type CH 53.

BRIEF DESCRIPTION OF THE DRAWINGS

The following description explains one embodiment of the military motor vehicle according to this invention in conjunction with the accompanying drawings, in which.

DESCRIPTION OF SPECIFIC EMBODIMENTS

Figure 1:
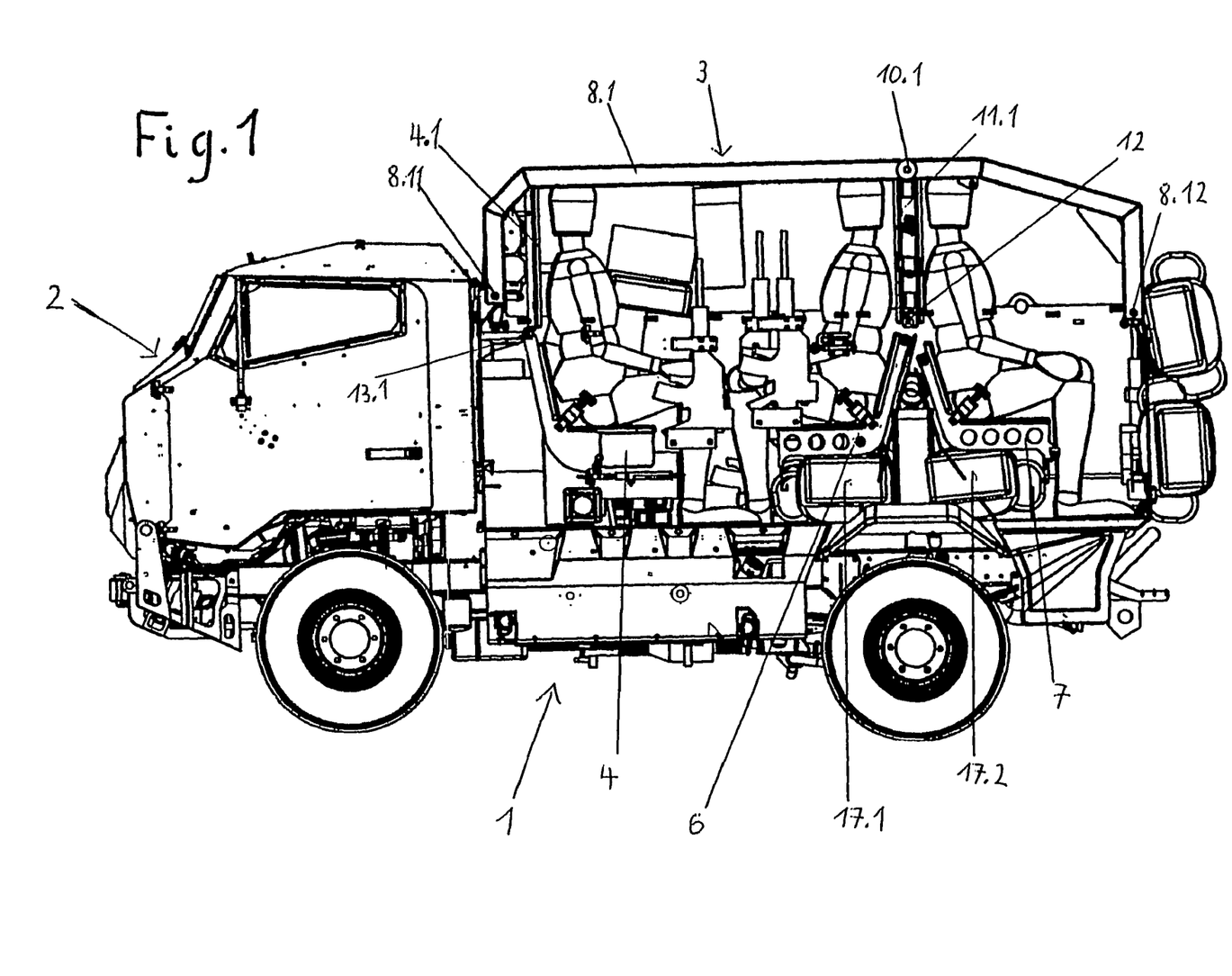
FIG. 1 shows a partially sectioned side view of a military motor vehicle.
Figure 2:
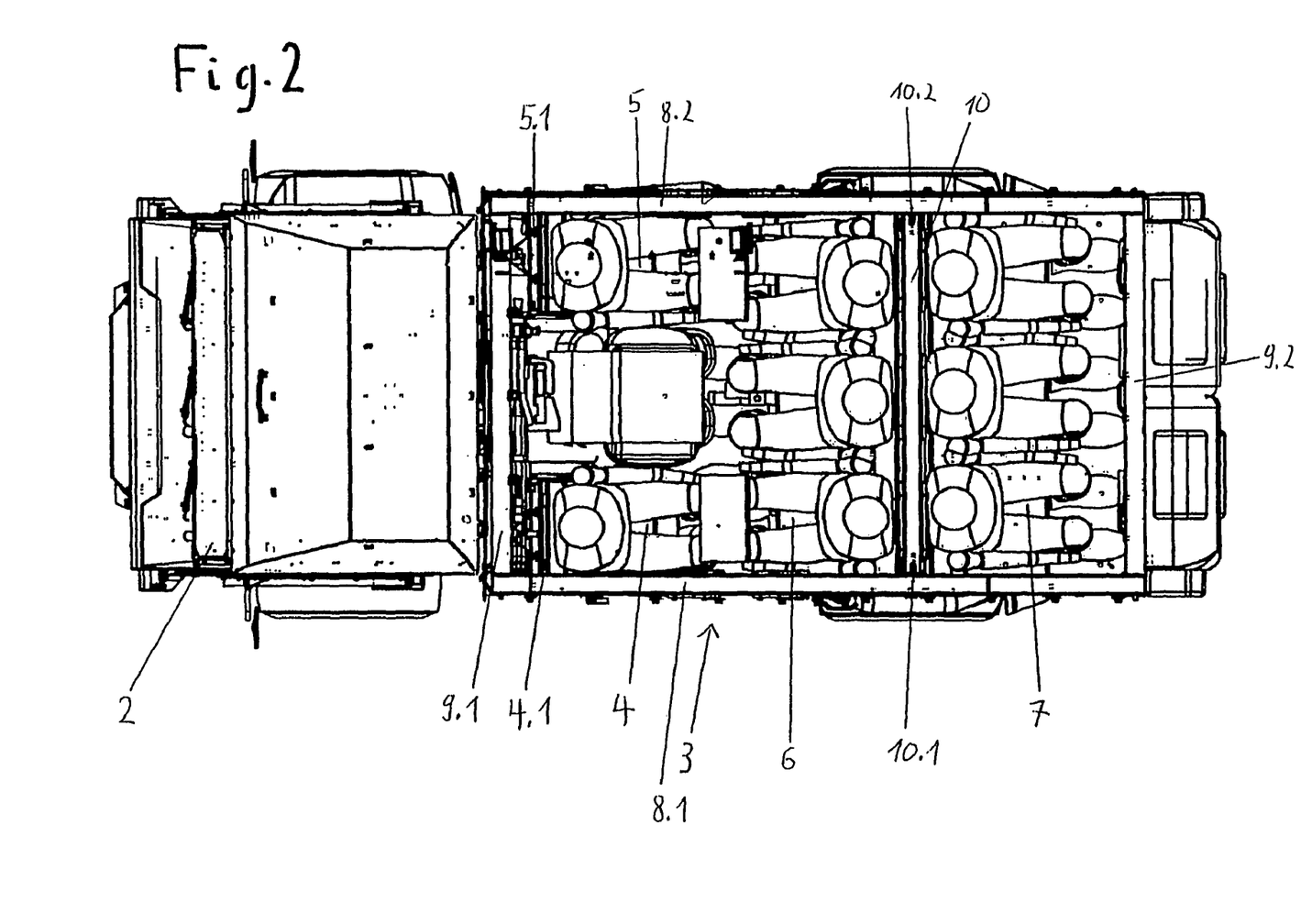
FIG. 2 shows the military motor vehicle according to FIG. 1 in top plan view, the tarpaulin covering the transport structure removed.
Figure 3:
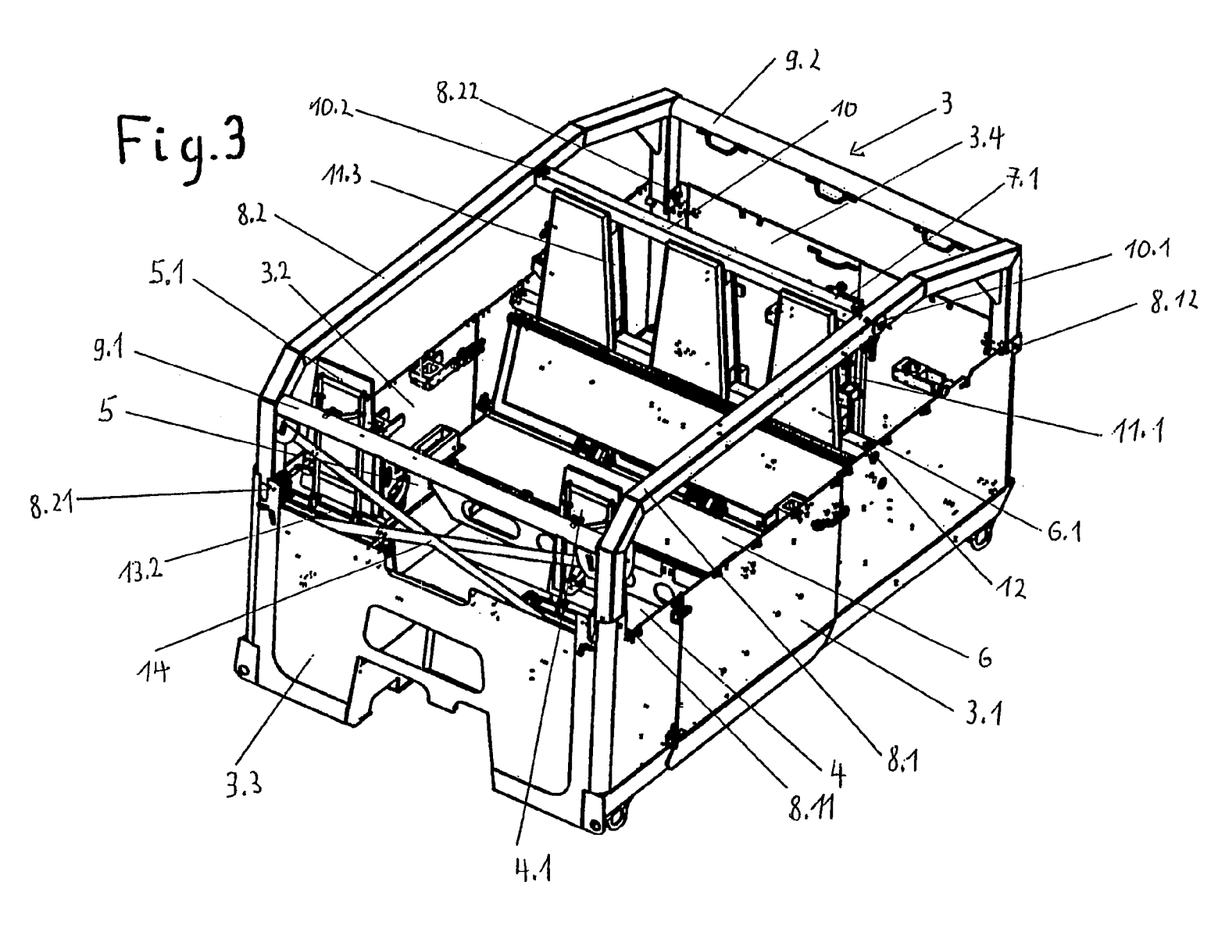
FIG. 3 shows the transport structure of the military motor vehicle according to FIGS. 1 and 2 in perspective representation.

The military motor vehicle represented in the drawings is designed for transporting personnel. It is comprised of a chassis 1, on which a driver's cabin 2 is placed in the front and a transport structure 3 for seating personnel is placed in the rear. The tarpaulin that can cover the open top of the transport structure is not shown. In the front part of the transport structure 3, two single seats 4 and 5 are located facing opposite to the direction of travel. In the middle part of the transport structure, behind the single seats 4 and 5, a bench 6 seats three persons facing in the direction of journey. In the back part of the transport structure, behind bench 6, another bench 7 seats three persons facing opposite to the direction of travel. Seats 4 and 5 have backrests, each with a horizontal axis of rotation 13.1, 13.2. This way, the upper parts 4.1 and 5.1 of seats 4 and 5 can be tilted rearwards. Benches 6 and 7 have the upper parts of their backrests 6.1 through 6.3 in common. The horizontal axis of rotation 12 allows for them to be tilted.

Figure 5:
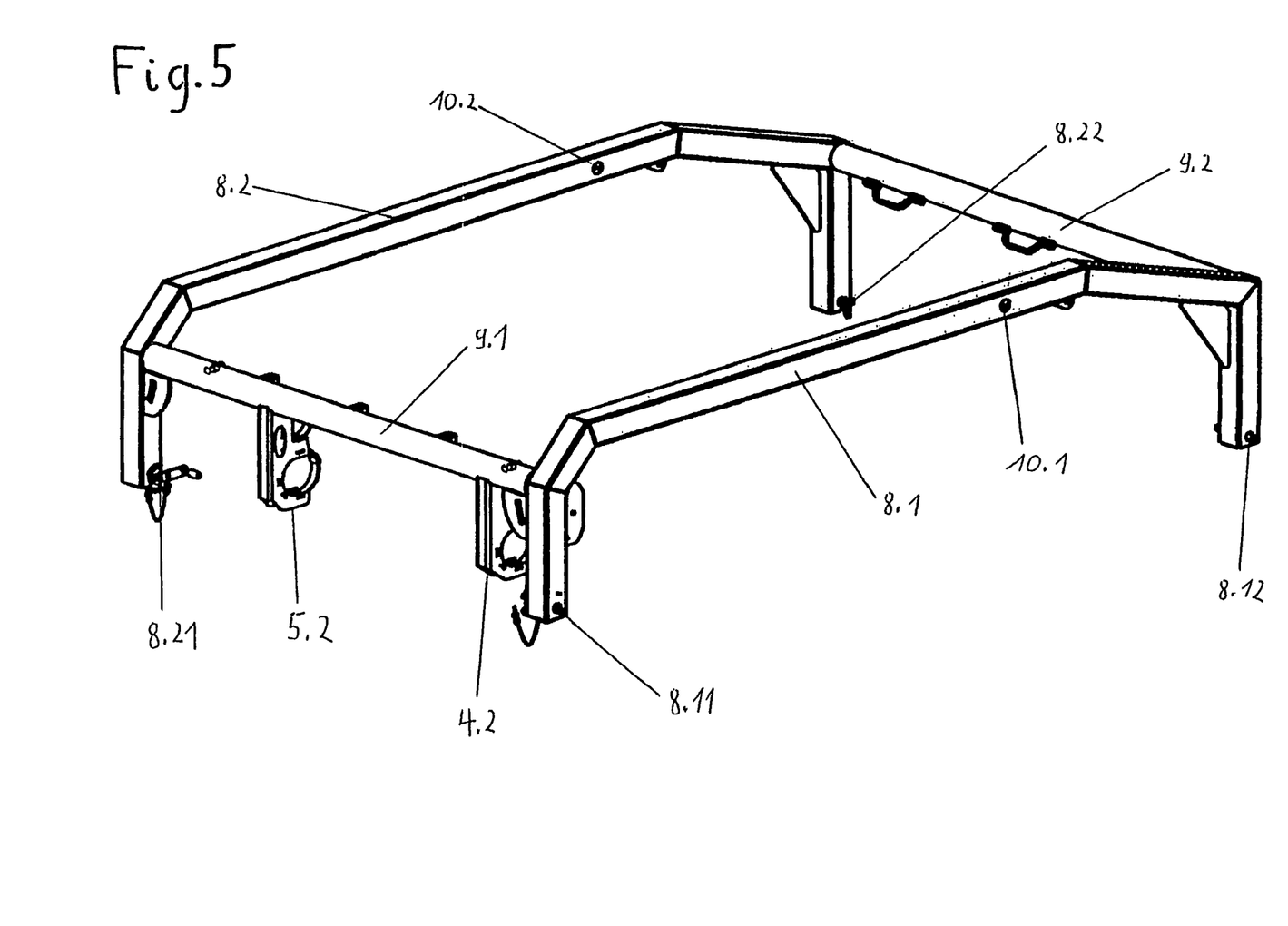
FIG. 5 shows the roll protection device of the transport structure, according to FIG. 3, in perspective detailed representation.

A roll protection device is located on top of the transport structure 3. It comprises two roll bars 8.1 and 8.2, each of them located above one of the side walls 3.1 and 3.2 and extending over the full length of the transport structure 3. The ends of each roll bar 8.1 and 8.2 are releasably connected to the transport structure 3 by locking mechanisms 8.11, 8.12, 8.21 and 8.22. The two roll bars 8.1 and 8.2 are interconnected by three reinforcing elements, running transverse to them. The first reinforcing element is located in the front part of roll bars 8.1 and 8.2. It is formed as a crossbar 9.1, which is fixedly attached to the roll bars 8.1 and 8.2 and is connected to the upper parts 4.1 and 5.1 of seats 4 and 5 by the attachment elements 4.2 and 5.2. The second reinforcing element is located on the back end of the roll bars 8.1 and 8.2, above the back wall 3.4 of the transport structure 3. It is formed as a crossbar 9.2, which is also fixedly attached to the roll bars 8.1 and 8.2.

Figure 4:
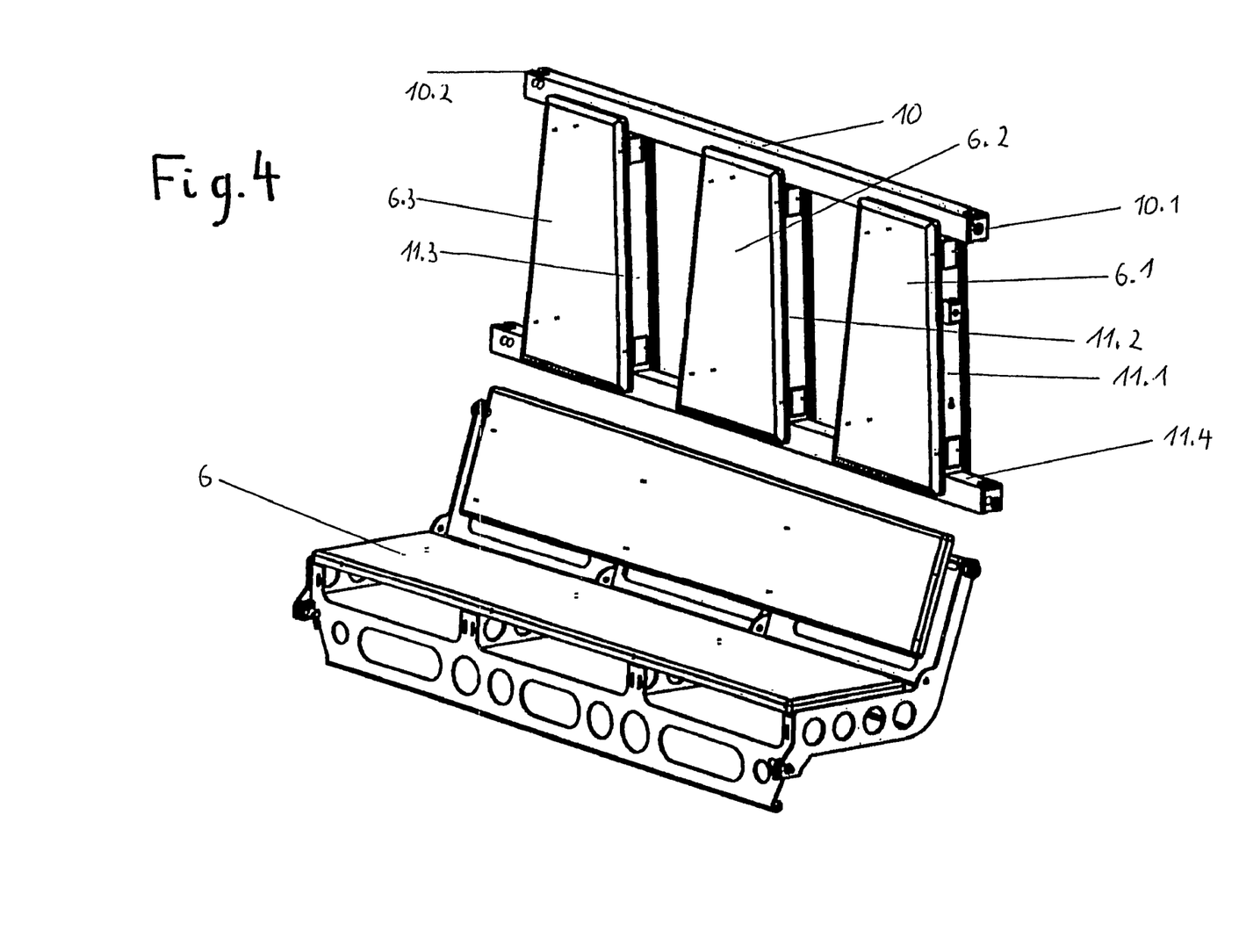
FIG. 4 shows the middle bench of the transport structure according to FIG. 3 in perspective detailed representation.

A third reinforcing element is the crossbar 10, located between crossbars 9.1 and 9.2. It is connected to the roll bars 8.1 and 8.2 by the swivel joints 10.1 and 10.2. The crossbar 10 is attached firmly to swivel arms 11.1, 11.2 and 11.3, which can be rotated around their common pivot axis 12. In the embodiment described here this is possible because the swivel arms 11.1, 11.2 and 11.3 are integrated in the upper parts 6.1, 6.2 and 6.3 of the backrests of the benches 6 and 7. They are arranged in such a way that the swivel arms 11.1 though 11.3 together with the upper parts 6.1 through 6.3 of the backrests can be rotated around axis 12 and brought from an upright, locked position to a lower, inclined position. The axes of rotation are approximately located at halfway along the height of the transport structure 3.

Figure 6A:
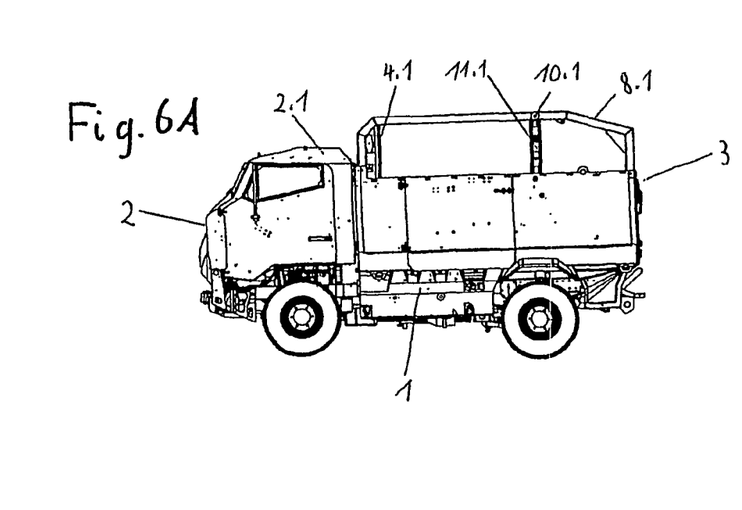
FIG. 6A-6D show a scaled down side view of the military motor vehicle according to FIG. 1-5 in different phases, preparing it for loading.
Figure 6B:
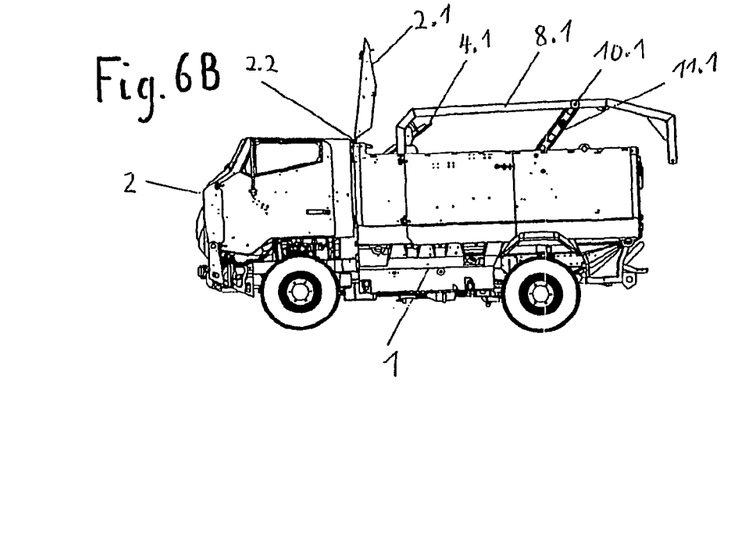

On the basis of the construction described above, the roll bars 8.1 and 8.2 can be moved rearwards after releasing the locking devices 8.11, 8.12, 8.21 and 8.22. By doing this, the roll bars 8.1 and 8.2 can be shifted from a work position into a lower transport position. FIG. 6A shows the roll bars in work position, FIG. 6B illustrates an intermediate position and FIG. 6C the end position with the roll bars 8.1 and 8.2 shifted rearwards all the way. FIG. 6D shows the complete arrangement of lowered roll bars 8.1 and 8.2, all rocking arms that support roll bars 8.1 and 8.2 and the seats or parts of seats that are connected to the swivel arms. For further reinforcement, the transport structure 3 is equipped with diagonal reinforcing members. FIG. 3 shows an example of such a reinforcing element the front wall 3.3 of transport structure 3 has two diagonally running cables 14. In addition, the backrests of benches 6 and 7 and their integrated neck supports serve as reinforcing elements. None of the seats and benches is attached to the floor of the transport structure 3, and benches 6 and 7 are self-supporting. As shown in FIG. 1, cargo can be stored in the spaces 17.1 and 17.2 underneath benches 6 and 7. The design of both benches limits the cargo space underneath and prevents the cargo from shifting.

The driver's cabin 2 of the military motor vehicle has a roof 2.1 that is connected to the back wall of the driver's cabin by hinges (22). Due to these hinges, the roof can be manually shifted rearwards traveling through an angle of more than 180° and coming to rest between the side walls of the transport structure 3. This makes it possible to reduce the total height of the driver's cabin 2 to meet loading requirements. The process is shown in FIG. 6A through 6D. In FIG. 6B, the roof 2.1 of the driver's cabin is shown in a partly shifted position. A torsion-bar spring not shown facilitates the opening and closing of hood 2.1. The initial tension in the spring is adjusted in such way that the roof 2.1 is relieved at an aperture angle of approximately 90°. That means that the effort necessary to shift the hood 2.1 either way is initially facilitated by the torsion-bar spring.

Figure 6C:
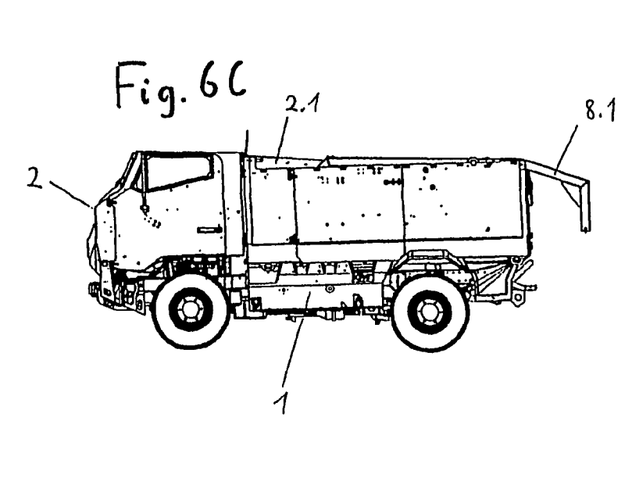
Figure 6D:
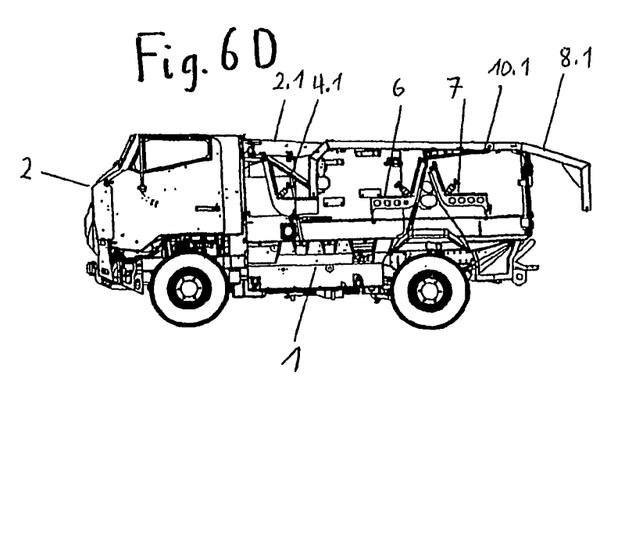
Figure 7:
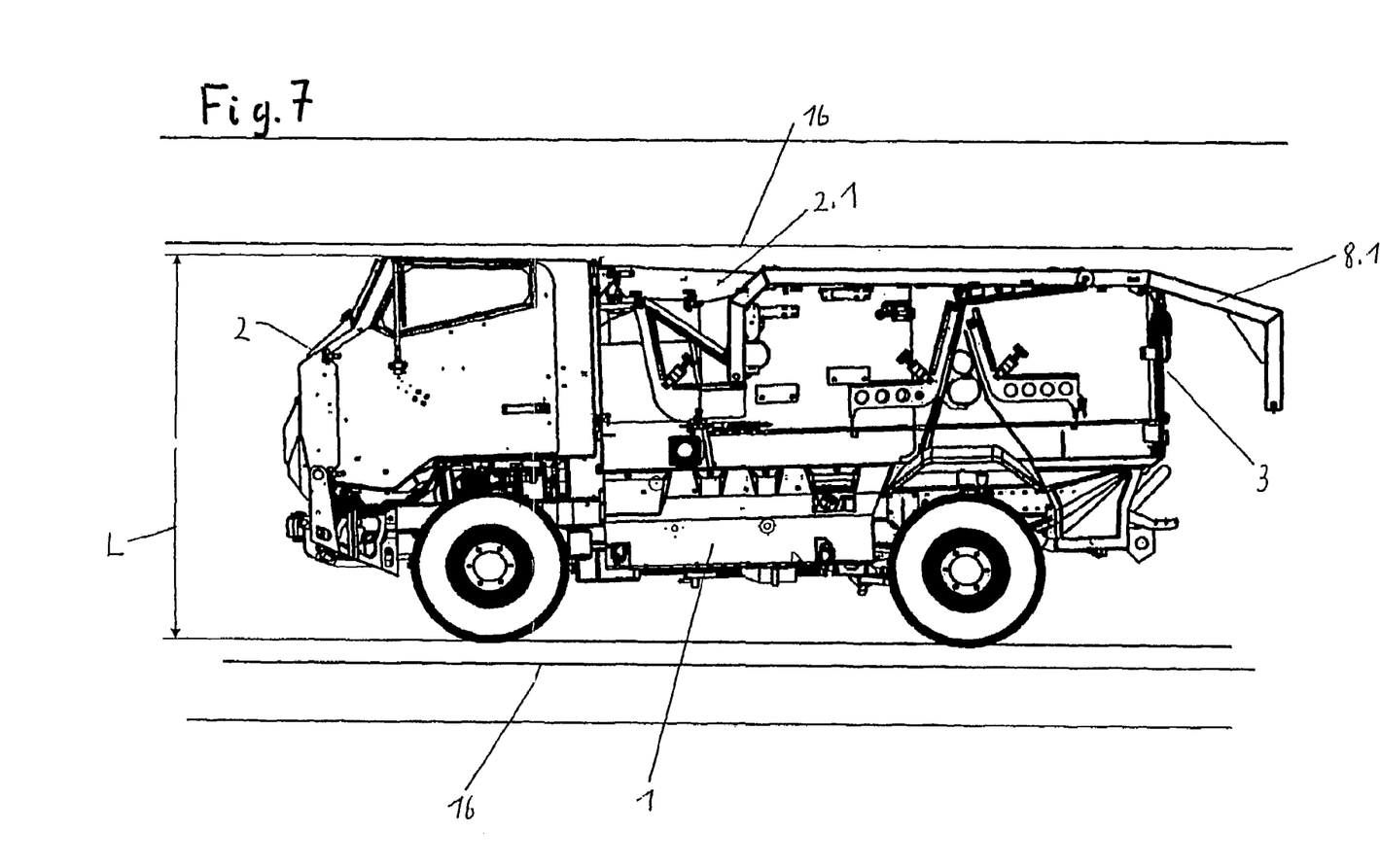
FIG. 7 shows the military motor vehicle according to FIGS. 1-6, loaded into a helicopter type CH 53.

FIGS. 6C and 6D illustrate that a combination of folding back the roll protection device and folding back the roof of the driver's cabin reduces the height of the military motor vehicle significantly. FIG. 7 shows that the height can be reduced to L=1,890 mm. It is then possible to load the military motor vehicle into a helicopter, e.g. type CH 53. In FIG. 7 the flight space 16 of a helicopter CH 53 is indicated schematically. The figure shows that the military motor vehicle can be loaded into the helicopter.

The specification incorporates by reference the disclosure of German priority document 103 23 076.9 filed May 22, 2003 and PCT/DE2004/000873 filed Apr. 27, 2004.

The present invention is, of course, in no way restricted to the specific disclosure of the specification and drawings, but also encompasses any modifications within the scope of the appended claims.

The invention claimed is:

1. A military motor vehicle for transporting personnel comprising:

a chassis;

a drivers cabin disposed on said chassis;

an upwardly open transport structure, which is adapted to be covered by a tarpaulin, disposed on said chassis behind said driver's cabin;

a plurality of seats or benches disposed in said transport structure for accommodating personnel; and a roll protection device disposed on an upper side of said transport structure and comprising two roll bars, each of which is disposed over a side wall of said transport structure and extends in a longitudinal direction of said transport structure over the entire length thereof, wherein each of said roll bars has two ends, each of which is releasably attached to said transport structure, further wherein said roll bars are interconnected by reinforcing elements that extend transverse to said longitudinal direction, further wherein at least one of said reinforcing elements is embodied as a crossbar that is fixedly connected to both of said roll bars, further wherein at least one of said reinforcing elements is embodied as a crossbar that is connected with said roll bars via swivel joints, further wherein said crossbar is fixedly connected to swivel arms that are pivotable about horizontal horizontal axes, further wherein said swivel arms are integrated into backrests of at least two adjacent ones of said seats or in upper parts of backrests of said bench, and wherein said backrests or upper parts of backrests are pivotable, about said horizontal pivot axes, out of a lockable position into a tilted position.

2. A motor vehicle according to claim 1, wherein said fixed crossbars are disposed in a region of at least one of a front and rear end of said roll bars.

3. A motor vehicle according to claim 2, wherein at least one of said fixed crossbars is connected via attachment elements with backrests or upper parts of such backrests of those of said seats that are disposed in a front portion of said transport structure, and wherein said backrests or upper parts thereof are adapted to be folded down about horizontal pivot axes.

4. A motor vehicle according to claim 1, wherein said crossbar that is connected with said roll bars via said swivel joints is disposed between two of said crossbars that are fixedly connected with said roll bars.

5. A motor vehicle according to claim 1, wherein at least a front side of said transport structure is provided with diagonal reinforcing members that connect said roll bars.

6. A motor vehicle according to claim 5, wherein said diagonal reinforcing members comprise cables or belts that extend diagonally in a cross-section of said transport structure.

7. A motor vehicle according to claim 1, wherein at least a portion of said backrest of said seats or of said benches, with neck supports integrated therein, have a supporting function for a lateral stability of said roll protection device.

8. A motor vehicle according to claim 1, wherein said drivers cabin is provided with a roof that is adapted to be shifted away, about hinges disposed on a rear wall of said drivers cabin, rearwardly about at least 180° between side walls of said transport structure.

9. A motor vehicle according to claim 8, wherein a torsion-bar spring is provided for facilitating opening and closing of said roof, and wherein said spring has an initial tension such that said spring is relieved at a roof opening angle of about 90°.

10. A motor vehicle according to claim 1, wherein said seats and said benches are not attached to a floor of said transport structure.

11. A motor vehicle according to claim 10, wherein said benches are self-supporting.

12. A motor vehicle according to claim 10, wherein said benches delimit a cargo space beneath them.

13. A military motor vehicle for transporting personnel comprising:

a chassis;

a driver's cabin disposed on said chassis;

an upwardly open transport structure, which is adapted to be covered by a tarpaulin, disposed on said chassis behind said driver's cabin;

a plurality of seats or benches disposed in said transport structure for accommodating personnel; and a roll protection device disposed on an upper side of said transport structure and comprising two roll bars, each of which is disposed over a side wall of said transport structure and extends in a longitudinal direction of said transport structure over the entire length thereof, wherein each of said roll bars has two ends, each of which is releasably attached to said transport structure, further wherein said roll bars are interconnected by reinforcing elements that extend transverse to said longitudinal direction, further wherein at least one of said reinforcing elements is embodied as a crossbar that is fixedly connected to both of said roll bars, further wherein at least one of said reinforcing elements is embodied as a crossbar that is connected with said roll bars via swivel joints, further wherein said crossbar is fixedly connected to swivel arms that are pivotable about horizontal pivot axes, further wherein disposed at a prescribed distance behind a first one of said crossbars that is connected with said roll bars via swivel joints is a second crossbar that is connected with said roll bars via swivel joints and is fixedly connected to swivel arms that are pivotable about horizontal pivot axes, further wherein said swivel arms of both of said crossbars that are connected with said roll bars via swivel joints are integrated into backrests of at least two adjacent seats or into backrests of said bench, and wherein at least an upper portion of said backrest is pivotable about said horizontal pivot axes out of a lockable upright position into a tilted position.

* * * * *